United States Patent
Westlake

Patent Number: 6,077,005
Date of Patent: Jun. 20, 2000

[54] VEHICLE WITH COLLAPSIBLE PLATFORM

[75] Inventor: Wayne S. Westlake, South Lake, Tex.

[73] Assignee: Trinity Industries, Inc., Dallas, Tex.

[21] Appl. No.: 08/980,255

[22] Filed: Nov. 28, 1997

[51] Int. Cl.⁷ .................................................. B60P 7/08
[52] U.S. Cl. ................................ 410/49; 410/42; 410/47
[58] Field of Search ................................ 410/36, 42, 47, 410/49; 105/377.01, 377.08, 404, 355, 362, 370; 211/169, 169.1; 206/391, 394, 446

[56] References Cited

U.S. PATENT DOCUMENTS

| | | |
|---|---|---|
| 2,958,492 | 11/1960 | Maynard . |
| 2,971,795 | 2/1961 | Winski . |
| 2,977,900 | 4/1961 | Farrar . |
| 3,009,426 | 11/1961 | Nampa . |
| 3,061,255 | 10/1962 | Gallo et al. . |
| 3,186,357 | 6/1965 | Fillion . |
| 3,223,259 | 12/1965 | Nicholson . |
| 3,291,072 | 12/1966 | Cunningham . |
| 3,291,073 | 12/1966 | James ............................................. 410/49 |
| 3,307,495 | 3/1967 | Chapman et al. . |
| 3,307,497 | 3/1967 | Chapman et al. . |
| 3,392,682 | 7/1968 | Francis ........................................... 410/42 |
| 3,413,931 | 12/1968 | Augustine, Jr. . |
| 3,465,692 | 9/1969 | Hyatt . |
| 3,508,503 | 4/1970 | Daly ................................................ 410/49 |
| 3,581,674 | 6/1971 | O'Leary ...................................... 410/49 X |
| 3,605,638 | 9/1971 | James ............................................. 410/49 |
| 3,628,466 | 12/1971 | Lyons et al. ............................... 410/49 X |
| 3,658,011 | 4/1972 | West et al. . |
| 3,875,617 | 4/1975 | Cline . |
| 3,922,004 | 11/1975 | Chamberlain . |
| 4,102,274 | 7/1978 | Feary et al. . |
| 4,204,479 | 5/1980 | Rosa . |
| 4,240,773 | 12/1980 | Terry . |
| 4,315,707 | 2/1982 | Fernbach .................................... 410/47 |
| 4,367,059 | 1/1983 | Stubbins ..................................... 410/44 |
| 4,451,188 | 5/1984 | Smith et al. ................................ 410/42 |
| 4,526,500 | 7/1985 | Patrick ........................................ 410/48 |
| 4,580,843 | 4/1986 | Lund ........................................ 410/42 X |
| 5,170,717 | 12/1992 | Richmond et al. ..................... 410/49 X |
| 5,191,842 | 3/1993 | Tinkler . |
| 5,211,518 | 5/1993 | Mimica ....................................... 410/50 |
| 5,343,813 | 9/1994 | Septer . |
| 5,401,129 | 3/1995 | Eatinger ..................................... 410/49 |
| 5,425,608 | 6/1995 | Reitnouer ................................... 410/49 |
| 5,476,348 | 12/1995 | Shelleby ..................................... 410/49 |
| 5,538,376 | 7/1996 | Borda .......................................... 410/99 |

Primary Examiner—Stephen T. Gordon
Attorney, Agent, or Firm—Baker Botts L.L.P.

[57] ABSTRACT

A transportation vehicle, such as a railroad coil car, solves long standing problems in the prior art by removing platform requirements from the decking area, thus increasing the space for loading coils or other cylindrical objects. There is disclosed at least one folding platform, which, when closed, is contained or disposed within the side sill of the vehicle. When the platform is closed, and the vehicle is moving, it does not violate government regulations. However, when the vehicle is to be loaded or unloaded in a stationary position, the platform can be opened and extend laterally from the side of the vehicle.

11 Claims, 6 Drawing Sheets

VEHICLE WITH COLLAPSIBLE PLATFORM

BACKGROUND OF THE INVENTION

1. Field of the Invention

The present invention relates to vehicles for carrying coils of various materials. More particularly, the present invention relates to a railcar for carrying coils of various materials such as coil steel, etc. Most particularly, the present invention relates to a railcar for carrying coils of various materials having side sills and at least one foldable platform disposed within or contained within at least one of said side sills.

2. Description of the Prior Art

The prior art in the field of coil carrying vehicles is somewhat voluminous. The problem has always existed and still exists until the time of the present invention as to how to carry the maximum number of coils of a material, for example coiled steel, in the allowable space.

The allowable space is often determined by government regulations, rather than the carrier. For example, state highway departments typically limit the maximum height, width and length of trailers which may be hauled by semitractors. This, in turn, has spurred much work related to to getting the maximum usage of the available space for this type of vehicle.

Similarly, in the field of rail transportation, as will be discussed further hereinbelow, the American Association of Railroads prescribes the maximum envelope or space that a railcar can occupy so that a railcar will be able to traverse bridges and tunnels throughout the country.

Known railcar arrangements for hauling coils of various materials are disclosed, for example, in U.S. Pat. Nos. 2,977,900; 3,009,426; 3,186,357; 3,291,072; and 4,451,188.

The U.S. Pat. No. 2,997,900 issued to A. J. Farrar shows a removable cover for railcars transporting steel coils. The cover is used on a gondola-car with cradles formed in the bottom of the car to retain the steel coils. The body of the gondola-car includes a narrow platform along the outer edge of the car.

The U.S. Pat. No. 3,291,072 to J. B. Cunningham discloses a support system for carrying different size coils. The outer support members are fixed at a downward slope. The two inner support members are hinged at both ends so that they can be inverted to divide a single large storage position into two smaller storage positions.

The U.S. Pat. No. 3,186,357 to S. H. Fillion shows a side sill and top flange arrangement. Planks extend the length of the car and extend at a downward angle from the side sills to a center sill. This forms a cradle which is an integral part of the car structure and shocks applied through the couplers are absorbed by cushioning mechanisms.

The U.S. Pat. No. 3,009,426 to S. M. Nampa shows a railcar for transporting steel coils which include a hinged cover to enclose the steel coils. Wooden planks run the length of the cradle and are bolted to angled members. The wooden planks define the surface of the trough which engages the steel coil. The cover is split down the middle and is hinged at the outer edges. The cover rotates to permit coils to be loaded from the top or from the ends of the enclosure.

U.S. Pat. No. 4,451,188 to Smith et al. shows a support deck with trough assemblies mounted on the support deck. The trough assemblies have a configuration which facilitates the mounting of various coil sizes. A cover is mounted on corner posts and edge rails of the car. The edge rails are a fixed component, and are used to support the cover. Moveable troughs can be used to change the configuration of the decking for different coil arrangements.

While these known configurations of coil cars help the railroad industry carry more and larger coils they all suffer from one common problem in that a platform was needed around the entire car for workers to stand on while assisting in the loading and unloading of the coils. Thus, the entire 128" width permitted by the American Association of Railroads (AAR) plate "C" for coil cars could not be used, and maximum capacity could not be achieved. Thus, those skilled in the art continued to search for a solution to the long standing art of how to maximize the capacity of coil carrying vehicles in the permitted space.

SUMMARY OF THE INVENTION

The present invention solves the long standing problems in the prior art by removing platform requirements from the decking area, thus increasing the space for loading coils or other cylindrical objects. This is done by providing at least one folding platform, which, when closed, is contained or disposed within the side sill of a railway car. Thus, when the platform is closed, and the car is moving, it does not violate AAR regulations. However, when the car is to be loaded or unloaded in a stationary position, the platform can be opened and extend laterally from the side of the car.

In one embodiment of the present invention, a folding platform for railway cars having side sills is provided, wherein the folding platform is contained within a side sill in its closed position, and extends laterally of the railcar in its open position.

In another embodiment of the present invention, there is provided in a railway car having longitudinally extending side sills joined together by a plurality of support members. At least one folding platform is mounted to each of said longitudinally extending side sills. The at least one folding platform is contained within the side sill(s) in its closed position, and extends laterally of the railcar in its open position.

In a further modification of the present invention, there is provided a vehicle for carrying cylindrical objects. The vehicle includes a pair of spaced apart longitudinally extending side sills defining a loading area therebetween. Support means are provided intermediate said side sills, and at least one folding platform is mounted to said at least one of said longitudinal side sills for movement between a closed position within said at least one side sill and an opened position where said at least one folding platform extends laterally of said vehicle. An operating means is connected to said at least one folding platform to extend and retract said platform.

In a still further embodiment of the present invention, there is provided a vehicle for carrying cylindrical objects. The vehicle includes a pair of spaced apart longitudinally extending side sills defining a loading area therebetween. Hinge or support means are provided intermediate said side sills. At least one folding platform is mounted to said at least one of said longitudinal side sills for movement between a closed position within said at least one side sill, and an open position where said at least one folding platform extends laterally of said vehicle. An operating means is connected to the hinge or support means to extend and retract said platform. A cover is provided which is placeable on said vehicle in such a manner to enclose said cylindrical objects and to contact and operate said operating means to close said at least one folding platform when said cover is in place on said vehicle.

Therefore, it is an object of the present invention to provide for an improved coil carrying vehicle which maximizes the coil carrying capacity of the vehicle within the permitted size restraints on the vehicle.

Another object of the present invention to provide a railcar in the form of a coil carrying car which maximizes the capacity of the car within the permitted AAR restraints.

A still further object of the present invention is to provide a coil carrying railcar which can use the entire permitted width of the railcar for loading of coils or other cylindrical objects thereon.

Further objects and advantages of this invention will be apparent from the following description and appended claims, reference being made to the accompanying drawings forming a part of the specification, wherein like reference characters designate corresponding parts in the several views.

It is to be understood that the present invention is not limited in its application to the details of the construction, or arrangement of parts, illustrated in the accompanying drawings, since the invention is capable of other embodiments and being practiced or carried out in various ways within the scope of the claims. Also, it is to be understood that the phraseology and terminology employed herein is for the purpose of description, and not of limitation.

DESCRIPTION OF THE PREFERRED EMBODIMENT

Figure 1:
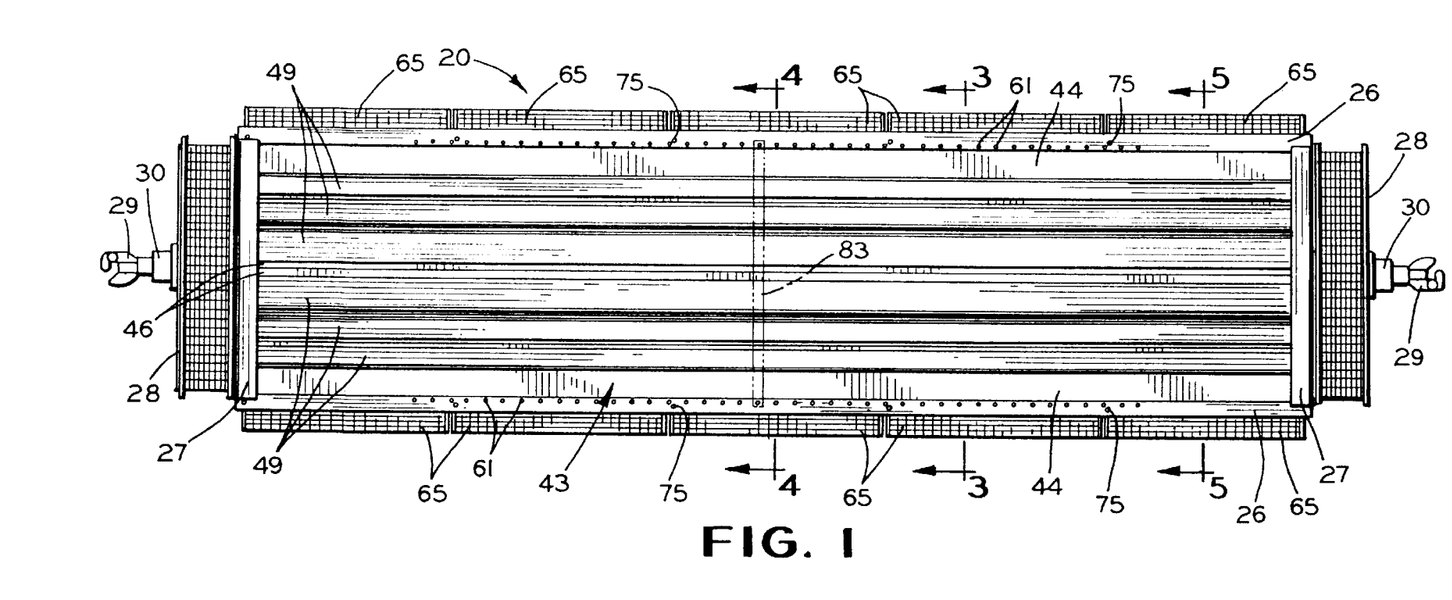
FIG. 1 is top plan view of a construction embodying the present invention.
Figure 2:
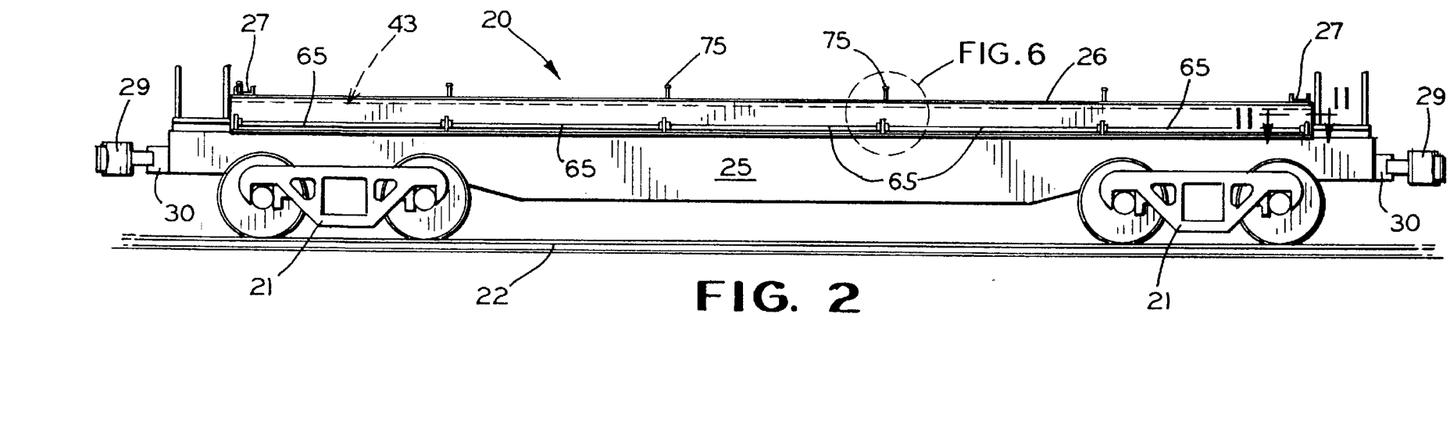
FIG. 2 is a side elevational view of the construction shown in FIG. 1.

Referring to FIGS. 1 and 2 there is shown a railroad coil car generally designated by the numeral 20. The railroad coil car 20 is carried by a pair of trucks 21 on the rails 22 in manner well known in the art.

Railroad coil car 20 has a railcar body 25 including a pair of side sills 26 and a pair of end sills 27 welded or otherwise joined together by means known in the art. End platforms 28 as well as couplers 29 carried by draft gear 30 are also provided. Other devices pertinent to proper operation of the railroad coil car 20, such as a brake pipe, brake valve, glad hands, a reservoirs, hand rails, a hand brake, and the like, all required by Federal Railway Administration regulations, are omitted for the purpose of clarity.

Side sills 26 are further supported by a plurality of support means, such as cross-beams 32 (FIG. 3), cross-bearers 33 (FIG. 4), and body bolsters 34 (FIG. 5), all provided intermediate said side sills.

Figure 3:
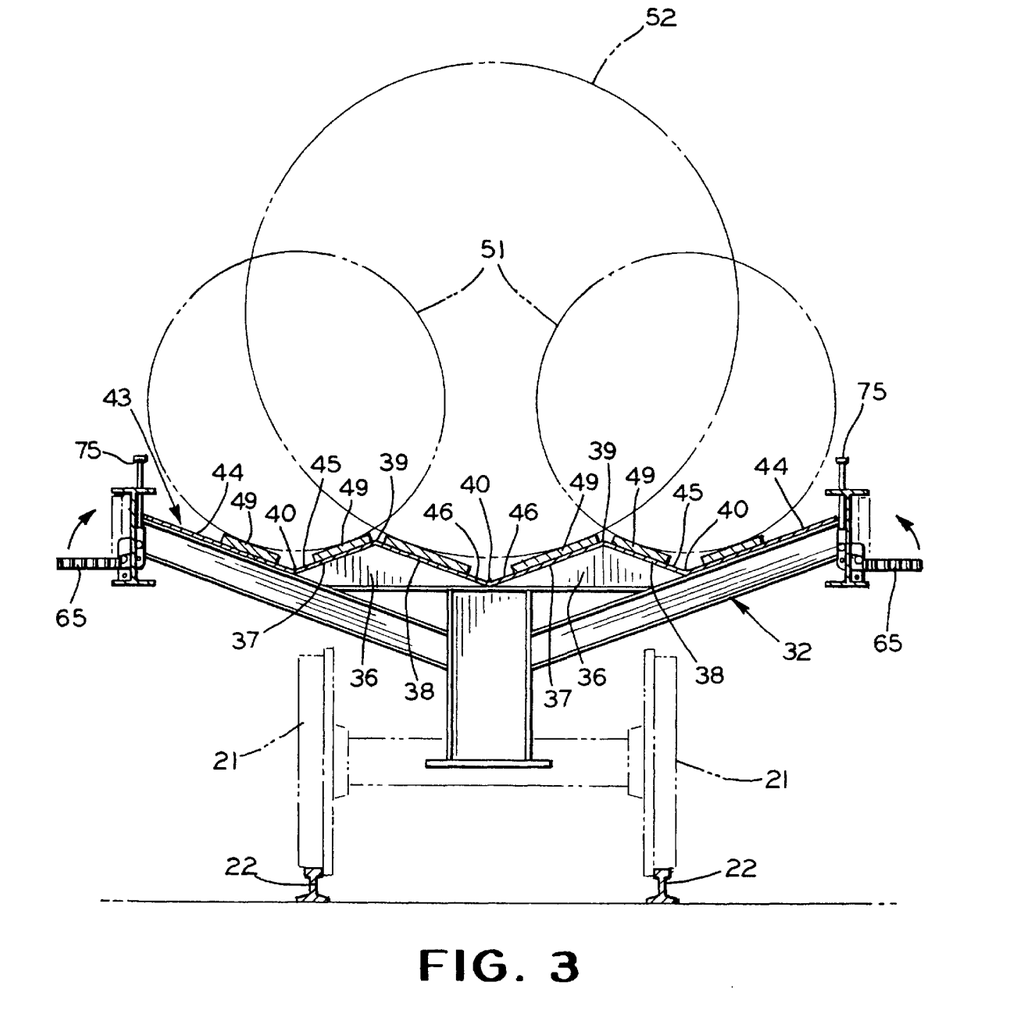
FIG. 3 is a sectional view, taken in the direction of the arrows, along the section line 3—3 of FIG. 1.
Figure 4:
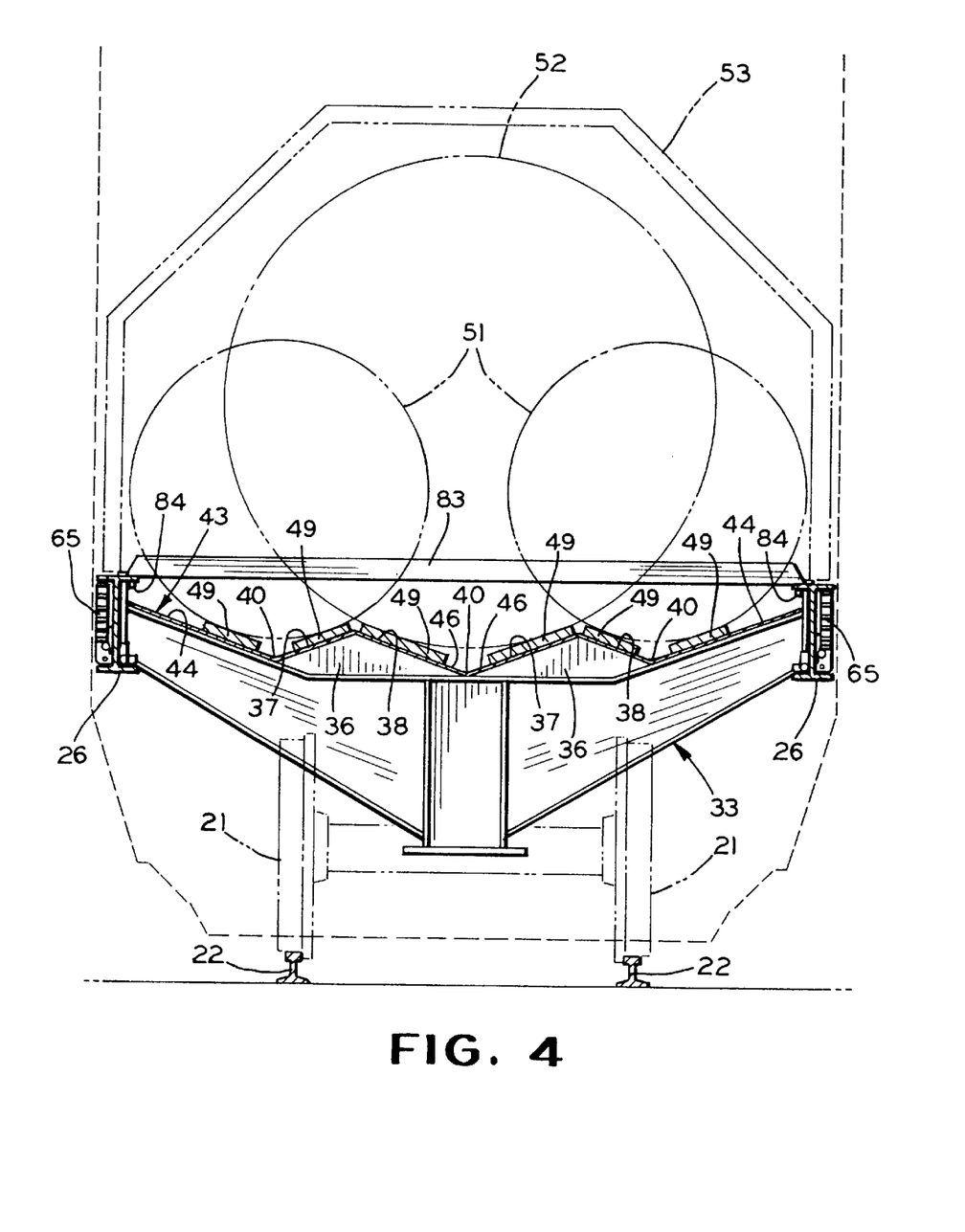
FIG. 4 is a sectional view, taken in the direction of the arrows, along the section line 4—4 of FIG. 1.
Figure 5:
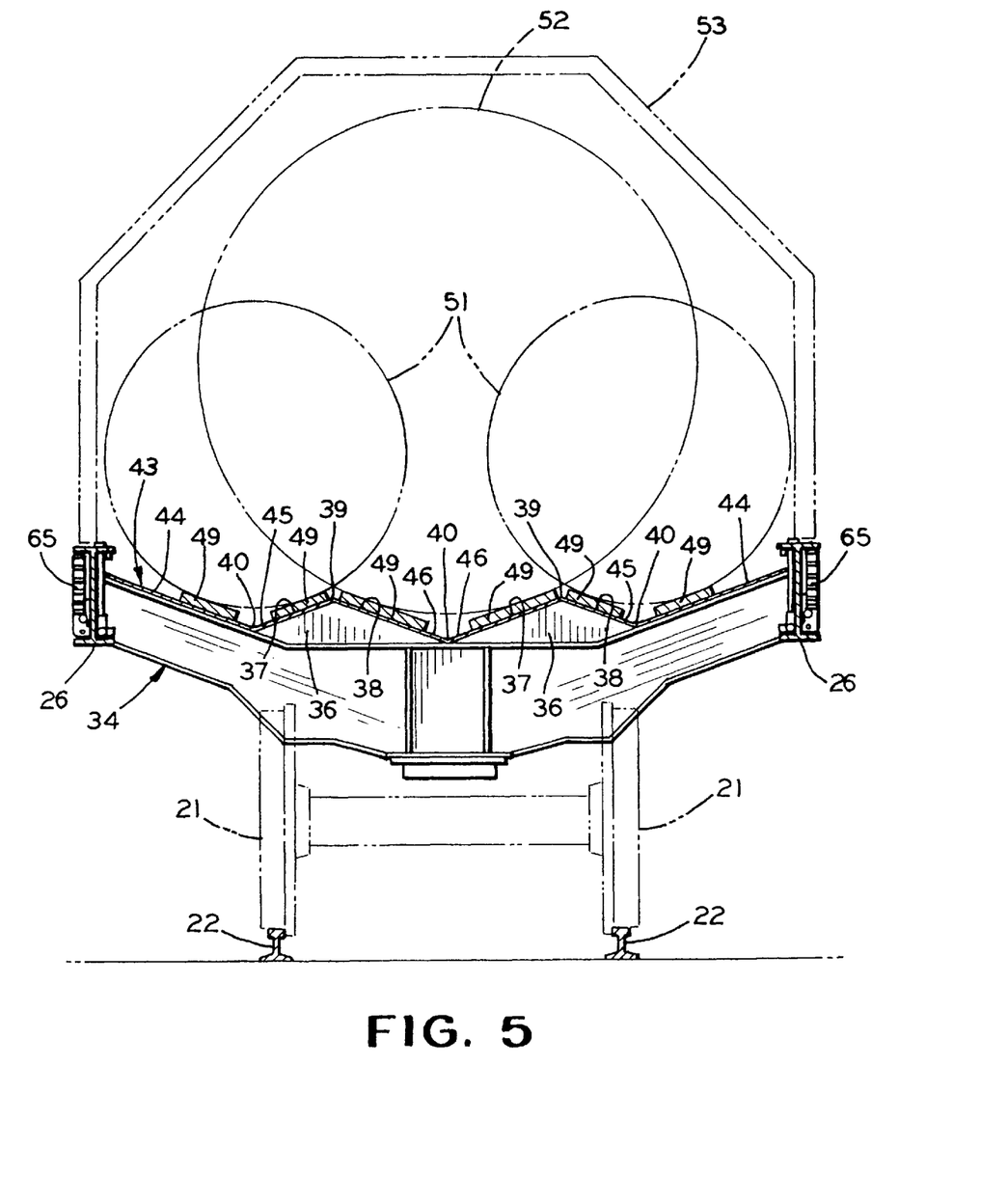
FIG. 5 is a sectional view, taken in the direction of the arrows, along the section line 5—5 of FIG. 1.

Attached to the upper surface of each cross-beam 32, cross-bearer 33, and body bolster 34 are a pair of vertically extending steel plates 36 having a first sloped surface 37 and a second sloped surface 38. The first sloped surface 37 and the second sloped surface 38 ascend to a peak 39.

While peaks 39 are formed on the vertically extending steel plates 36 by the converging of the ascending first sloped surface 37 and second sloped surface 38, valleys 40 are formed wherever the first sloped surface 37 and the second sloped surface 38 meet the cross-beams 32, cross bearers 34, or body bolsters 35.

A plurality of longitudinally extending decking sheets is welded or otherwise suitably fastened to the entire length of the car. In the preferred embodiment, a pair of outer or first decking sheets 44 is provided immediately adjacent the side sills 26. A pair of intermediate or second decking sheets 45 is provided immediately adjacent said first pair of decking sheets 44. A pair of inner or third decking sheets 46 is provided adjacent said second pairs of decking sheets 45, and in adjoining positions. The deck 43, therefore, will consist of seriatim (with respect to a transverse crossing of the deck) first decking sheet 44, second decking sheet 45, third decking sheet 46, another third decking sheet 46, second decking sheet 45, and first decking sheet 44. This provides the entire deck 43 with a series of peaks 39 and valleys 40 therein.

To complete the load carrying surface or deck 43, a plurality of slats 49, preferably made of a material that will not mar the surface of the coils being carried, is mounted in a longitudinally extending, parallel, spaced relationship over the entire length of the deck 43. Preferably, one slat 49 is provided on each of said decking sheets (44, 45, and 46).

An additional advantage of the present invention can now be understood. There is illustrated on the deck 43, a pair of 50" coils 51, and an 84" coil 52. In the preferred embodiment of the invention, the deck 43 is designed to carry one row of 84" coils, or two rolls of 50" coils, or partial arrangements thereof. While the maximum allowable weight of the railcar, i.e., a 286,000 pound gross weight under FRA regulations, limits the amount of coils that can be placed on a coil car, the fact that no platform space needs to be allowed for permits accommodation of 84" and 50" coils on the same car. Previously, the typical railroad coil car could only accommodate a row of 84" coils in combination with 36" coils, and not 50" coils as in the present invention.

If it is desired to only accommodate a row of 84" coils, it can easily be understood that the deck 43 of the railroad coil car 20 can be reconfigured to have a single trough. The row of 84" coils 52, and 50" coils 51, can still be accommodated even with the additional space taken up by the hood or cover 53.

Figure 6:
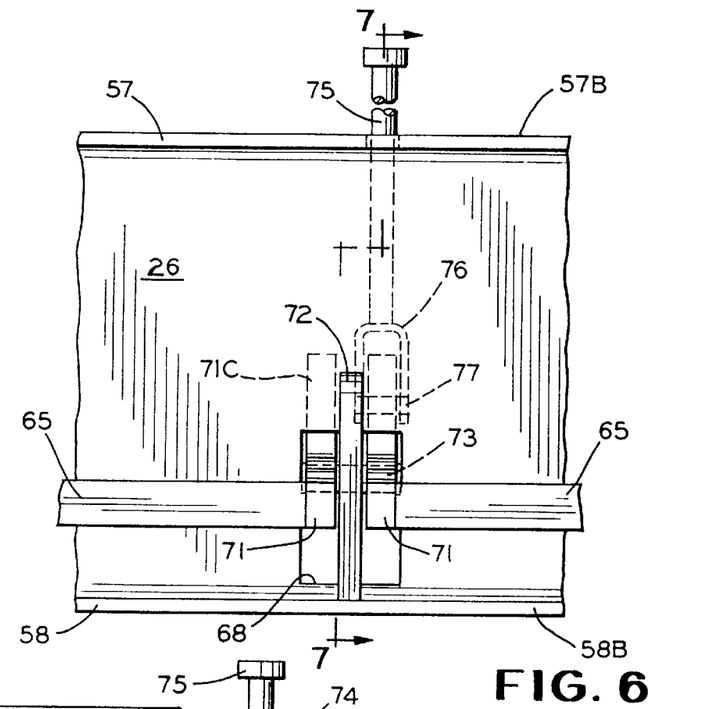
FIG. 6 is an enlarged fragmentary view of the area shown in the view circle 6 of FIG. 2.
Figure 7:
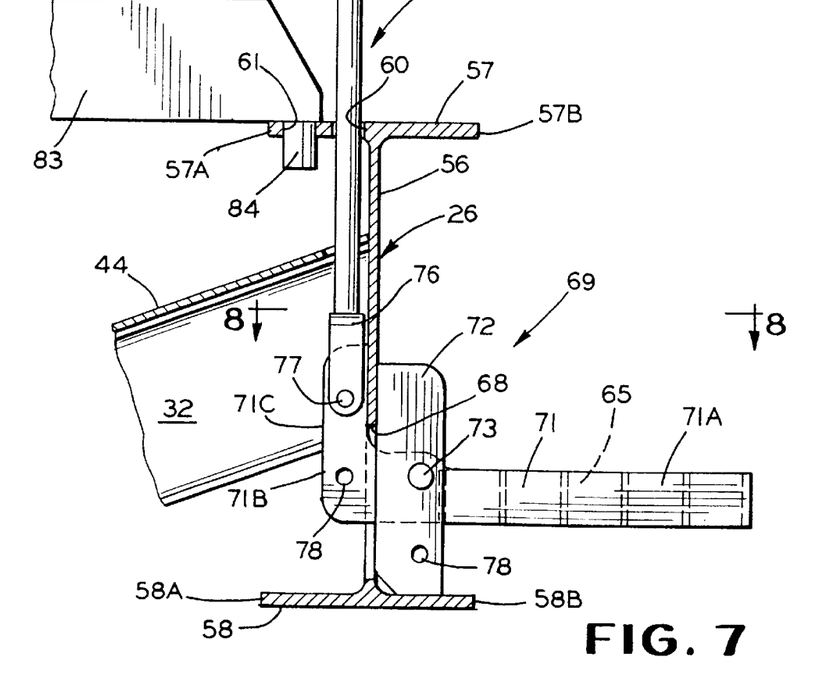
FIG. 7 is a sectional view, taken in the direction of the arrows, along the section line 7—7 of FIG. 6.

Referring to FIGS. 6 and 7, the coil car side sills 26 may be of standard I-beam construction having a web 56 connecting an upper flange 57 and a lower flange 58. Upper flange 57 may have (with respect to the railcar) an inner portion 57A and an outer portion 57B. Similarly, lower flange 58 may have (with respect to the railroad coil car 20) an inner portion 58A and a outer portion 58B.

In the inner portion 57A of the upper flange 57 is provided a first aperture 60 adjacent the web 56. A second aperture 61 is provided inboard of the first aperture 60 for purposes to be explained herein.

At least one, and preferably a plurality of platforms 65, are provided on each side of the railroad coil car 20. In their open positions, each platform 65 extends laterally of the railcar. In its closed position (FIG. 9), the platform is contained within the envelope or space provided by the web 26, the outer portion 57B of upper flange 57, and the outer portion 58B of lower flange 58. Thus, the platform does not extend past the side sill 26 in its closed position.

Hinge means 69 (FIG. 7) are provided to connect the platform 65 to the side sill 26, while at the same time providing a support function for the platform. operating means 74 are connected to hinge means 69 at one end of each platform to advance and retract, or open and close the platform 65.

Hinge means 69 may include such as a plurality of bearing supports 72, which are welded or otherwise fastened to the web 56, and outer portion 58B of lower flange 58, of the side sill 26 in a parallel spaced relationship.

Figure 8:
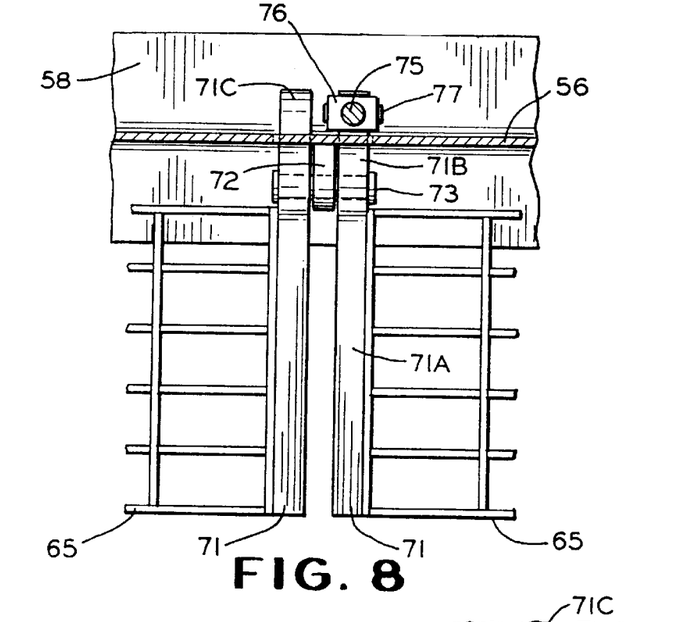
FIG. 8 is sectional view, taken in the direction of the arrows, along the section line 8—8 of FIG. 7.

Also forming a portion of the hinge means 69 is a pair of bell cranks 71, which are welded or otherwise fastened by means well known in the art to each end of platform 65. Each bell crank 71 has an attachment portion 71A which fastens to an end edge of the platform 65, a bearing portion 71B, and a stop portion 71C. To attach the bell crank 71, and thus the platform 65, in a pivoting manner to the bearing support 72, the stop portion 71C of each of the pair of bell cranks 71 is passed through slot 68 in side sill 26. Next apertures 80 in bell cranks 71 and bearing supports 72 are aligned, and a pair of pins 73 are put or fastened in place.

With this arrangement, the platform 65 will pivot about the pins 73. This will cause the stop portion 71C of the bell cranks 71 to contact the web 56 of the side sill 26 when the platform 65 is in its open or extended position. The stop portion 71C of the bell crank extends through slot 68 in the web 56 and bears against the inside thereof, thus not only limiting the travel of the platform 65, but providing support therefor in its open position.

Figure 9:
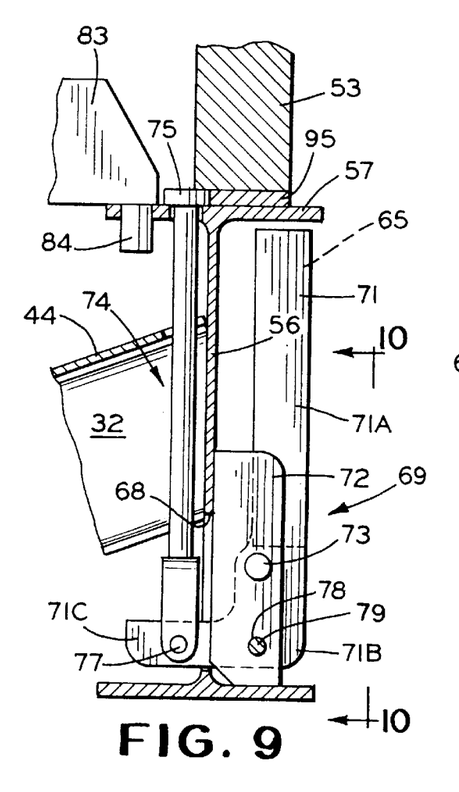
FIG. 9 is a view similar to FIG. 7, but showing the platform in its closed position.
Figure 10:
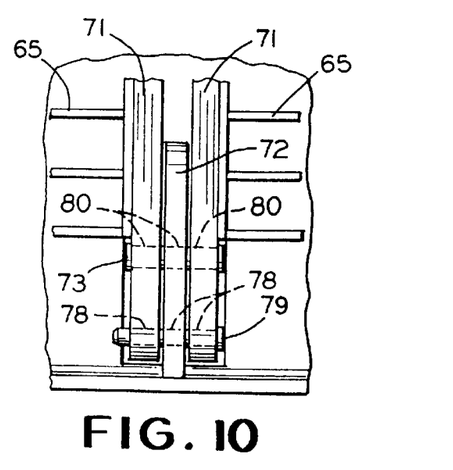
FIG. 10 is a sectional view taken in the direction of the arrows, along the section line 10—10 of FIG. 9.

Operating means 74 may include such as a plunger 75 attached to yoke 76. Yoke 76 is pinned by pin means 77 to the stop portion 71C of the bell crank 71. It can be easily understood that putting downward pressure on the plunger 75 causes the bell crank 71 to pivot around the pin 73 and retract the platform to its closed position as shown in FIG. 9.

To avoid the platform opening unintentionally while the railroad coil car 20 is in motion, a pair of locking holes 78 is provided, one each in the bell crank 71, and the bearing support 72. These are placed such that they will be in alignment when the platform 65 is in its closed position (FIG. 9) so that a locking pin 79 may be inserted.

Figure 11:
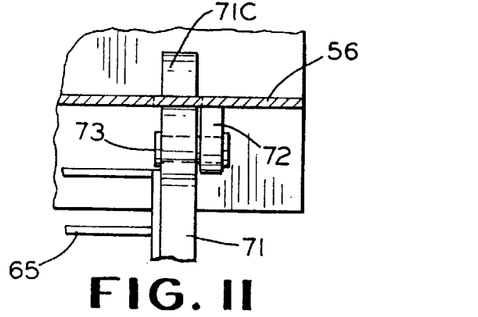
FIG. 11 is a sectional view taken in the direction of the arrows, along the section line 11—11 shown in FIG. 2.

Referring FIG. 11, it can be seen that at the extremities of the railroad coil car 20, since there is no adjacent platform 65, the bell crank 71 is simply pinned to the bearing support 72 by the pin 73.

Although operating means 74 are only shown as provided at one end of platform 65, with the other end of platform 65 simply pinned to bearing support 72, it can easily be understood by those skilled in the art that operating means 74 could be provided at both ends of each platform 65.

An additional advantage of the present invention can be seen from referring to FIGS. 4 and 9. Not only can the coils (51, 52) extend for substantially the maximum width of the railroad coil car 20, but if the hood or cover 53 is used, it can be accommodated entirely on the side sills 26 of the car. In addition, the hood or cover can automatically operate the plunger 75. When the coil car 20 is in position for loading, the platform 65 may be manually retracted, therefore extending the plunger 75 above the upper flange 57 of the side sill 26. When the loading is finished, the platform need not be manually retracted. Instead, as the cover or hood 53 comes in contact with the plunger 75, the plunger will be automatically retracted or depressed, closing or retracting the platform 65 in the manner just described. A seal 95 will protect the plunger 75 and the contents of the coil car 20 from the elements.

If it is desired not to have the plunger 75 extend above the side sill 26 during loading, due to the possibility of damage, etc., a pin or extension (not shown) may be provided on the cover, and the plunger 75 would remain below flange 57 when the platform 65 was open.

Another advantage of the present invention is to be able to provide coil spacers 83 which are nearly the full width of the railroad coil car 20, and to position them in a wide variety of positions. Previously described second aperture 61 in upper flange 57 accepts a spacer pin 84 attached to each end of the spacer 83. When the coils (51, 52) are loaded in position, the spacers 83 are positioned as desired adjacent the end surfaces of the coils (51, 52). While the configuration of the deck 43 prevents lateral movement of the coils, the spacers 83 are desirable to prevent axial movement of the coils should the rail coil car 20 suddenly come to an unexpected stop.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A folding platform for railway cars having a pair of side sills, said folding platform being contained within one of said side sills in a closed position and extending laterally of said one side sill in an open position comprising:
   hinge means to connect said folding platform to said one side sill, said hinge means including:
      a bell crank attached to said folding platform;
      a bearing support for connecting to said one side sill adjacent opposing ends of said folding platform; and
      a pin connecting said bell crank to said bearing support.

2. In a railway car having a pair of longitudinally extending side sills joined together by a plurality of cross-bearers and cross-beams, the improvement comprising a respective folding platform mounted to each of said longitudinally extending side sills, said folding platforms contained within said respective side sills in a closed position, and extending laterally of said railway car in an open position.

3. The railway car defined in claim 2, and further comprising
   hinge means to connect said folding platforms to said side sills.

4. The railway car defined in claim 3, and further including respective operating means to open and close said folding platforms.

5. The railway car defined in claim 4, wherein said operating means are connected to said hinge means.

6. The railway car defined in claim 3, wherein said hinge means further comprises:
   a bell crank attached to opposing ends of each of said platforms;
   a bearing support connected to said side sills adjacent opposing ends of each of said platforms; and
   a pin connecting each of said bell cranks to one of said bearing supports.

7. A vehicle for carrying cylindrical objects, said vehicle comprising:
 a pair of spaced apart longitudinal side sills defining a loading area therebetween;
 support means intermediate said side sills;
 at least one folding platform pivotally mounted to at least one of said longitudinal side sills for movement between a closed, retracted position within said at least one side sill and an open, extended position wherein said at least one folding platform extends laterally of said vehicle;
 operating means including a plunger connected to said folding platform with said plunger extending above said at least one side sill when said platform is in its open, extended position;
 said folding platform being in its open position when said plunger is extended, and in its closed position when said plunger is retracted; and
 a cover placeable on said vehicle to enclose said cylindrical objects, said cover contacting and depressing said plunger to close said folding platform when in place on said vehicle.

8. The vehicle defined in claim 7, and further including hinge means to connect said folding platform to said at least one side sill.

9. The vehicle defined in claim 8, and further including operating means to open and close said folding platform.

10. The vehicle defined in claim 9, wherein said operating means are connected to said hinge means.

11. The vehicle defined in claim 8, wherein said hinge means further comprises:
 a bell crank attached to said platform;
 a bearing support connected to said at least one side sill adjacent opposing ends of said platform; and
 a pin connecting said bell crank to said bearing support.

* * * * *